United States Patent
Petrus et al.

(10) Patent No.: US 7,269,389 B2
(45) Date of Patent: Sep. 11, 2007

(54) SELECTIVE POWER CONTROL MESSAGING

(75) Inventors: Paul Petrus, Santa Clara, CA (US); Sundar G. Sankaran, San Jose, CA (US)

(73) Assignee: Arraycomm, LLC, San Jose, CA (US)

( * ) Notice: Subject to any disclaimer, the term of this patent is extended or adjusted under 35 U.S.C. 154(b) by 1025 days.

(21) Appl. No.: 10/189,709

(22) Filed: Jul. 3, 2002

(65) Prior Publication Data

US 2004/0005905 A1    Jan. 8, 2004

(51) Int. Cl.
*H04B 7/05*    (2006.01)

(52) U.S. Cl. .......................... 455/69; 455/522

(58) Field of Classification Search .................. 455/69, 455/522; 370/328, 468, 470, 477
See application file for complete search history.

(56) References Cited

U.S. PATENT DOCUMENTS

| | | | |
|---|---|---|---|
| 6,075,974 A | 6/2000 | Saints et al. | |
| 6,151,508 A | 11/2000 | Kim et al. | |
| 6,334,047 B1 * | 12/2001 | Andersson et al. | 455/69 |
| 6,418,137 B1 | 7/2002 | Bontu et al. | |
| 6,519,236 B1 | 2/2003 | Haartsen et al. | |
| 6,744,754 B1 | 6/2004 | Lee | |
| 6,823,193 B1 | 11/2004 | Persson et al. | |
| 2002/0019245 A1 * | 2/2002 | Longoni et al. | 455/522 |
| 2002/0094835 A1 * | 7/2002 | Hayashi et al. | 455/522 |
| 2004/0258024 A1 | 12/2004 | Tiedemann, Jr. et al. | |

FOREIGN PATENT DOCUMENTS

| | | |
|---|---|---|
| EP | 0 977 370 | 2/2000 |
| GB | 2 341 294 | 8/2000 |
| WO | WO 02/33849 | 4/2002 |
| WO | PCT/US03/20924 | 2/2003 |
| WO | PCT/US03/28598 | 10/2003 |

OTHER PUBLICATIONS

Petrus, Paul, "Office Action Mailed Oct. 16, 2006", 19 pages.

* cited by examiner

*Primary Examiner*—Derrick W. Ferris
(74) *Attorney, Agent, or Firm*—Blakely Sokoloff Taylor & Zafman

(57) ABSTRACT

According to an embodiment of the invention, a method and apparatus are described to receive a signal, determine a quality of the received signal, and transmit a power control message, with a selected size, to request a modification in transmission power, the power control message being based at least in part on the quality of the received signal.

53 Claims, 6 Drawing Sheets

SELECTIVE POWER CONTROL MESSAGING

FIELD OF THE INVENTION

The invention relates generally to the field of wireless communications. More particularly, the invention relates to selective power control messaging.

DESCRIPTION OF THE RELATED ART

In wireless communications, it is desirable for signals to be transmitted with the lowest transmission power output that still provides desired signal quality and reliable communications. Reducing transmission power to a minimum conserves power for the transmitter, allowing either improved battery life for a portable device or better power sharing and lower cost of operation in the care of a multi-carrier transmitter. Further, minimizing transmission power output reduces the amount of electromagnetic power introduced into the radio frequency environment. Excessive transmission power can interfere with other communication links in a system.

Certain conventional methods are known for controlling transmission power. Among the possible methods is a "closed-loop" method. In one conventional variant of closed-loop transmission power control, the receiving end of a communications link monitors the quality of communications. If the communications quality falls below a certain reference value, a message is transmitted via a return communications path requesting an increase in the transmission power. If instead the communications quality exceeds a certain reference value, then a message is transmitted via the return communications path requesting a decrease in the transmission power.

However, power control messages are communications overhead, and any data bits that are devoted to power control are unavailable for communications. For this reason, the size of power control messages may be reduced, but at the cost of reducing flexibility. The smallest power control message that may be sent in one transmission is a one-bit message. In a conventional power control message of this type, the message requests either an increase or decrease in transmission power by some fixed amount. If the fixed amount is relatively small, a one-bit message may not allow for power modifications quickly enough. If the fixed amount is relatively large, the power modifications may not provide for modifications that are sufficiently fine to accurately control transmission power. Thus, a conventional system may allow for flexibility in power adjustment, but with a relatively large loss in communications, or may cause a minimal effect on communications, but with little flexibility in transmission power control.

BRIEF SUMMARY OF THE INVENTION

A method is provided for modification of transmission power levels based on the quality of received signals while requiring minimal data for power control messages. In one embodiment, a signal is transmitted by a first transceiver and received by a second transceiver. The second transceiver evaluates the quality of the received signal and transmits signal including a power control message, of a selected size, to request modification of transmission power. The power control message is based at least in part upon the quality of the received signal.

Under an embodiment of the invention, the power control message includes a basic power control message and an optional extended power control message. The basic power control message is always present in the power control message and requests an increase or decrease in power by a predetermined amount. The extended message is present in the power control message only when needed and requests a modification in transmission power level by an amount specified by the extended message.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements, and in which.

DETAILED DESCRIPTION OF THE INVENTION

Selective Power Control Messaging

An embodiment of the present invention provides for control of communications transmission power using a power control message of a selectable size, allowing for flexible power control while minimizing the amount of data that is required to transmit the control message.

Under an embodiment of the invention, a first radio transceiver transmits a signal to a second radio transceiver. Based at least in part on the quality of the received signal, the second radio transceiver transmits a message to the first radio transceiver, the message including a power control message requesting modification of the transmission power of the first radio transceiver. The power control message is of a size selected by the second radio transceiver based on the circumstances. Under one embodiment, the power control message includes a first portion and optionally includes an additional second portion, the second portion being included when the first portion isn't sufficient. Upon receiving the power control message from the second radio transceiver, the first radio transceiver adjusts its transmission power in response to the request.

Figure 1:
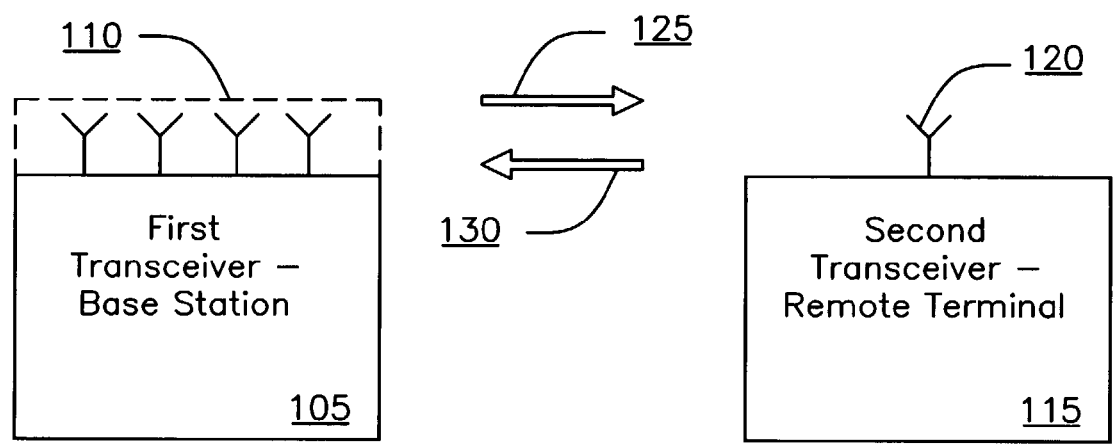
FIG. 1 is an illustration of a communication between a first device and a second device under an embodiment of the invention.

FIG. 1 is a simplified illustration of transmissions between a first device and a second device under an embodiment of the invention. In the illustration, the first device is shown as a base station 105 including multiple antennas.

The second device is shown as a remote terminal 115 with a single antenna. However, other types of devices may also use embodiments of the present invention. Further, the present invention may be implemented with the devices swapped, the remote terminal being the first device transmitting the first signal and the base station being the second device receiving the first signal. In this illustration the base station 105 transmits a first signal 125 to the remote terminal 115. The remote terminal evaluates a quality of the first signal 125. In one embodiment of the invention, the quality of the first signal is compared to a reference signal quality. The remote terminal transmits a second signal 130 to the base station 105. The second signal 130 includes a power control message of a selected size. In one embodiment, the power control message includes a basic power control message and an optional extended power control message. However, under other embodiments a power control message of selectable size may be constructed in different forms or may include additional elements.

Under an embodiment of the invention, a power control message includes a first power control message and an optional second power control message. In one embodiment, the first power control message is a basic power control message. The basic power control message is present in each power control message. The basic power control message is a request to increase the transmission power by a particular amount or to decrease the transmission power by a particular amount. In one embodiment, the second power control message is an extended power control message. The extended power control message is included in a power control message when the basic power control message is not sufficient. The extended power control message is a request to modify the transmission power by an amount specified by the extended power control message.

Under an embodiment of the invention, the basic power control message requires a single bit of data. The two possible values of the basic power control message indicate a request to either increase the transmission power by a predetermined amount or decrease the transmission power by a predetermined amount. In one embodiment, the basic power control message requests that transmission power be increased or decreased by one decibel, but in other embodiments the predetermined amount may vary, or the predetermined increase amount may be different than the predetermined decrease amount.

Under an embodiment of the invention, the extended power control message requires a plurality of bits of data and is a request to modify transmission power by an amount specified by the extended power control message. In one embodiment, the extended power control message uses five bits of data, but the size of the message may be different in other embodiments, or may be of varying size. Under one embodiment, the basic power control message is ignored if a power control message also includes an extended power control message. Under other embodiments, the basic power control signal may not be ignored in such circumstances, and, for example, may be included as part of the extended power control message, or may be used for other purposes in the power control message.

Under an embodiment of the invention, a basic power control message is included in a header of a message. In one embodiment, a header includes a fixed number of bits, one of which is the basic power control message. Under an embodiment of the invention, an extended power control message is included in a data payload of a message. Because the extended power control message is only included when needed, the communications data that is used for requesting a transmission power change is minimized. When the basic power control message is sufficient, only a small amount of information in the message header is needed to communicate the power control message. When the basic power control message is insufficient, the power control message includes the extended power control message in the data payload. The inclusion of the extended power control message in the data payload of a message reduces the amount of space available for communications data transmission, but such reduction in space is only necessary when the extended power control message is needed.

Figure 2:
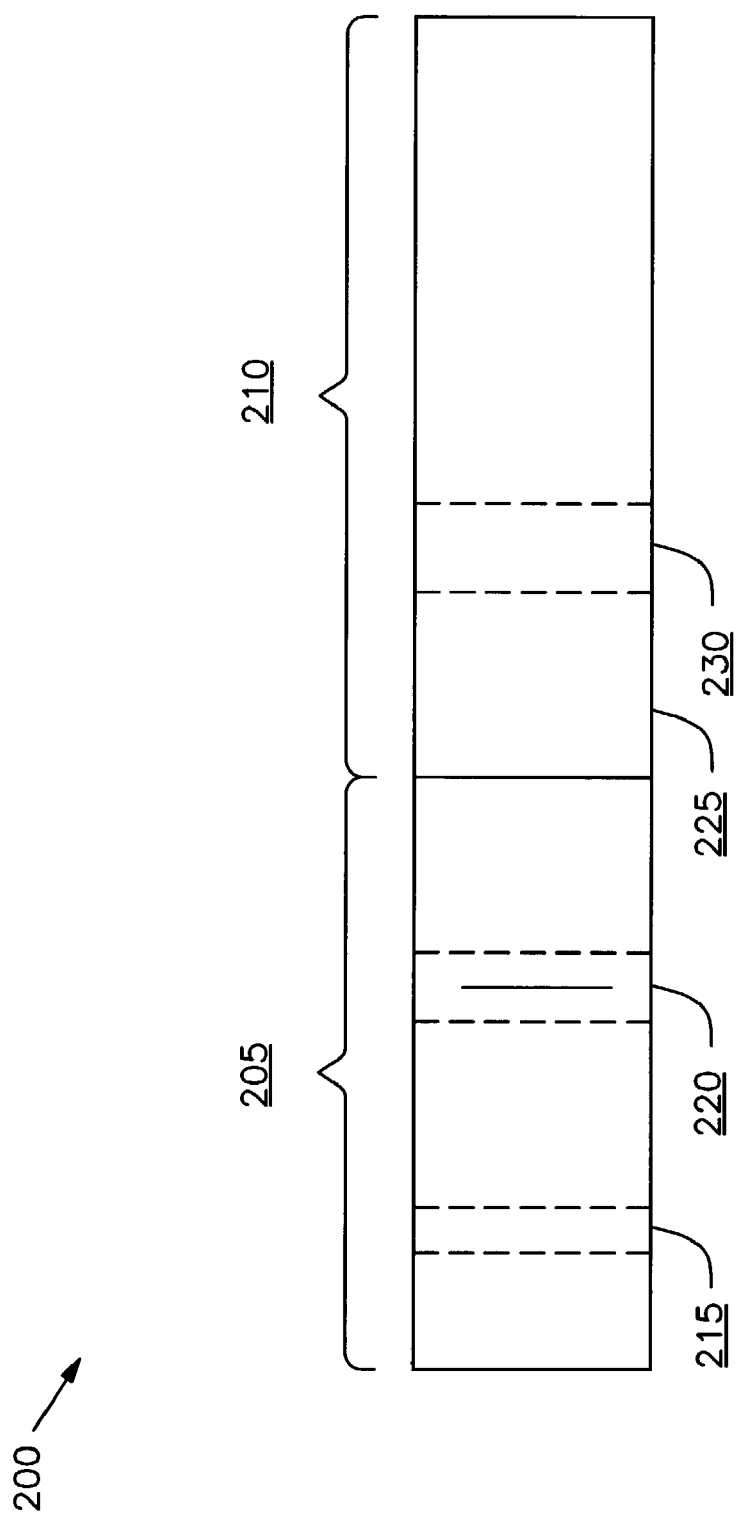
FIG. 2 is an illustration of a data transmission under an embodiment of the invention.

FIG. 2 is an illustration of a data transmission 200 under an embodiment of the invention. The data transmission 200 in FIG. 2 contains a power control message that is of a selected size. In FIG. 2, the power control message includes a basic power control message and an optional extended power control message. However, in other embodiments the power control message may be in many different forms and the possible selected sizes of the power control message may vary greatly. In the illustration shown in FIG. 2, the data transmission 200 includes a header 205 and a data payload 210. In one example, the header includes twenty-eight bits of data. The header 205 includes a basic power control message 215, the basic power control message requesting an increase in transmission power by a predetermined amount or a decrease in transmission power by a predetermined amount. In one example, the basic power control message includes a single bit of data.

In the illustration shown in FIG. 2, the header 205 further includes a type field 220 that indicates whether control messages are included in the data transmission 200. In one example, the type field 220 may include two bits of data. In this example, a "00" data set in the type field 220 may indicate the absence of control messages, while a "01" data set in the type field 220 may indicate the presence of control messages. As illustrated in FIG. 2, the data payload 210 includes one or more control messages 225. An extended power control message is included in the control messages 225 of the data payload 210. A boundary identifier 230 delineates the boundary between the control messages and the remainder of the data payload. In one example, the boundary identifier 230 requires one byte of data.

Figure 3:
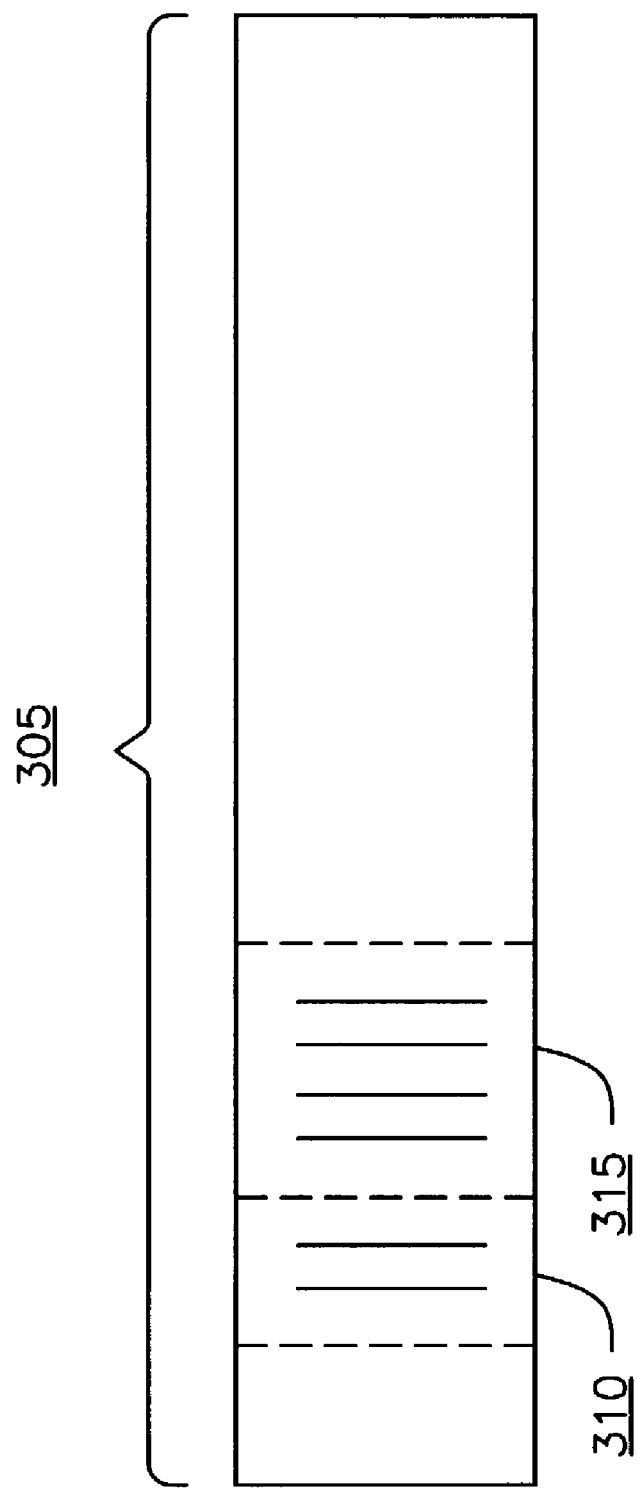
FIG. 3 is an illustration of a control messages contained in a data payload of a data transmission under an embodiment of the invention.

FIG. 3 is an illustration of control messages 305 included in a data payload of a data transmission under an embodiment of the invention. In the particular illustration shown in FIG. 3, a power control message has a selected size that includes an extended power control message 315. The extended power control message 315 is included in the control messages 305. In one example, the extended power control message 315 includes five bits of data. The extended power control message 315 requests a modification in transmission power by an amount specified by the extended power control message 315. The extended power control message 315 is preceded by a header 310 that distinguishes the extended power control message 315 from other control messages. In one possible example, header 310 uses three bits of data and uniquely identifies a control message as an extended power control message 315.

Under an embodiment of the invention, the quality of a received message is determined and the quality is compared to a reference signal quality. Under an embodiment of the invention, the measurement of the quality of the received signal is performed utilizing measurements of signal to interference plus noise ratio (SINR), but the quality measurement may be performed using numerous measures of quality, including signal to noise ratio (SNR), received signal strength indicator (RSSI), and frame error rate (FER).

These measures can all be determined using any of a variety of different techniques well-known in the art. Under one embodiment, the power control loop uses a simple proportional controller. The quality of the received signal is provided as an input to the proportional controller together with the reference signal quality. The proportional controller outputs the deviation between the received signal quality and the reference signal quality. The resulting deviation is then a measure of the tracking behavior of the power control loop.

Under an embodiment of the invention, if the resulting deviation is less than a certain threshold, the power control message includes only a basic power control message. If the resulting deviation is greater than the threshold, the power control message includes both the basic power control message and the extended power control message. Under other embodiments of the invention, the selected size of a power control message may vary in a different manner.

Figure 4:
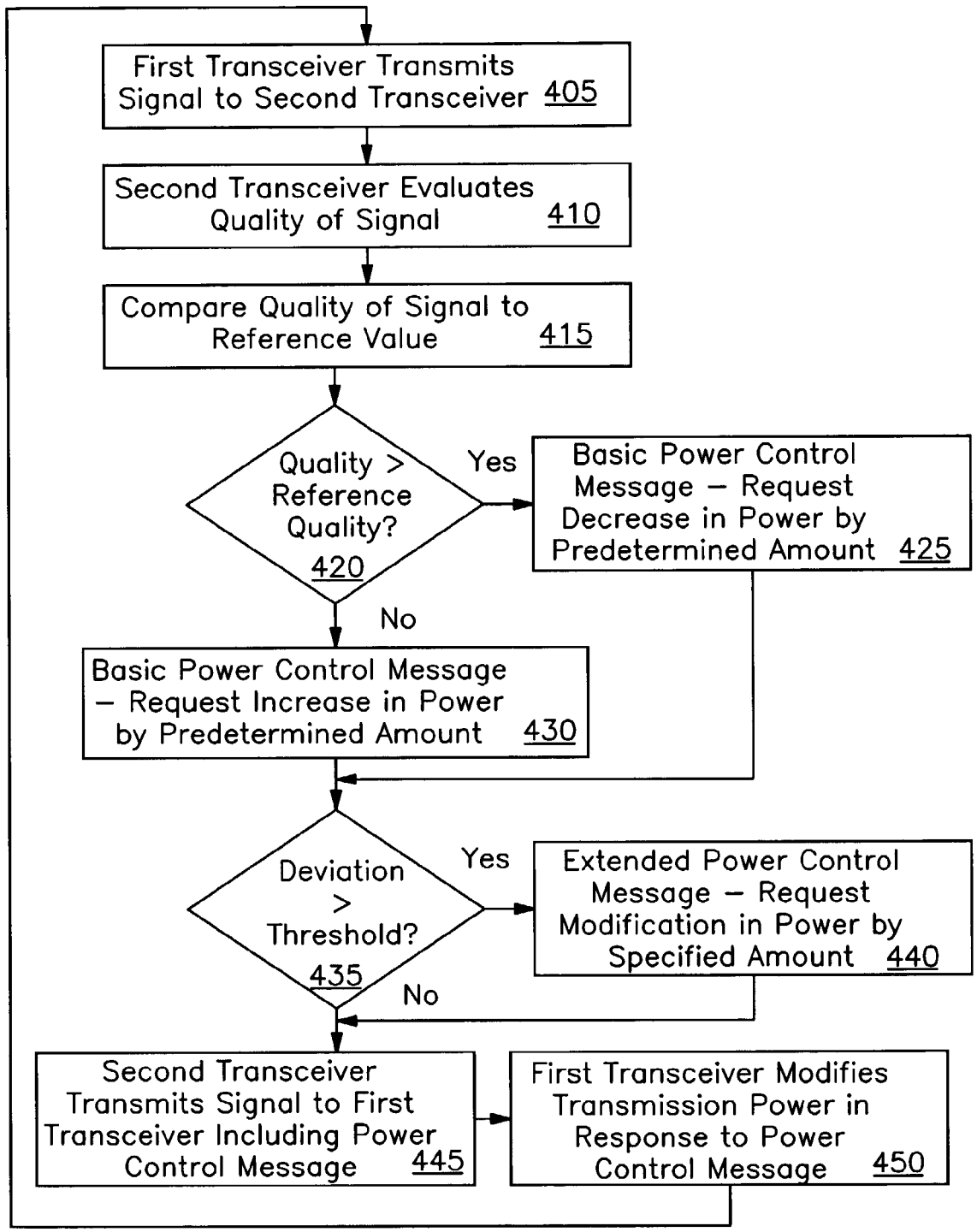
FIG. 4 is a flow diagram illustrating a process for transmission power control under an embodiment of the invention.

FIG. 4 is a flow diagram illustrating a process for transmission power control for communications between a first transceiver and a second transceiver under an embodiment of the invention. In the embodiment illustrated, the first transceiver transmits a signal to the second transceiver, 405. Upon reception, the second transceiver evaluates a quality of the signal, 410. Under an embodiment of the invention, the second transceiver compares the quality of the signal to a reference value, 415. If the quality is greater than the reference quality, 420, the basic power control message requests a decrease in power by a predetermined amount, 425. In other cases the basic power control message requests an increase in power by a predetermined amount, 430. If the deviation of the quality of the signal from the reference quality is greater than a certain threshold, 435, then an extended power control message is included that requests a modification in transmission power by an amount specified in the extended power control message, 440. The second transceiver transmits a signal including the power control message, 445. Upon receipt, the first transceiver adjusts its transmission power in response to the power control message, 450. Under a certain embodiment, the second transceiver ignores the basic power control message if an extended power control message is also received.

In certain embodiments of the invention, the circumstances in which an extended power control message is included may vary. In one embodiment, the extended power control message is included if the deviation exceeds the threshold for a certain number of consecutive bursts of data. Limiting the extended power control message to circumstances in which there are multiple occurrences of deviations outside of the established threshold minimizes situations in which there is a false triggering of the need for larger transmission power modifications because of a transitory change in signal quality. In another embodiment, quality measurements for a received signal are averaged over time to obtain a time averaged signal quality, and the time averaged signal quality is compared to a reference signal quality. The extended power control message is included in a power control message if the deviation between the time averaged signal quality and the reference signal quality is more than a certain threshold. The use of a time average of signal quality reduces instances in which signal fluctuations of short duration cause unnecessary requests for transmission power modifications.

Under one embodiment of the invention, the transmission of additional extended power modification messages may be suppressed for a certain period of time after an extended power control message has been transmitted. The suppression of a message for a certain period of time may allow a transmitter sufficient time to adjust the transmission power level as requested. If a second extended power control message is transmitted too soon after a first extended message, the second message may request an unnecessary adjustment causing the transmission power to overshoot the intended level and requiring another adjustment to fix the over correction.

If a communications channel is changing rapidly, then any power modifications requested may not be sufficient to accurately control the transmission power. Under one embodiment of the invention, if a deviation remains relatively large after multiple transmissions of the extended power change message, then transmissions of the extended power change request may be suppressed for some period to minimize the use of the communication channel for power control messages that are not effective. In one example, transmission of the extended power may be suspended for the duration of the communication link.

Under one embodiment of the invention, a signal modulation format may be adjustable. For example, a high signal quality format may include a relatively large amount of data per burst of data, while a low signal quality format may include a relatively small amount of data per data burst. In one example, an extended power control message is included in each message utilizing a high signal quality format because the overhead required is low compared to the available data rate. In another example, an extended power control message is not included in a message utilizing a low signal quality format because the overhead required is high compared to the available data rate.

Base Station Structure

Figure 5:
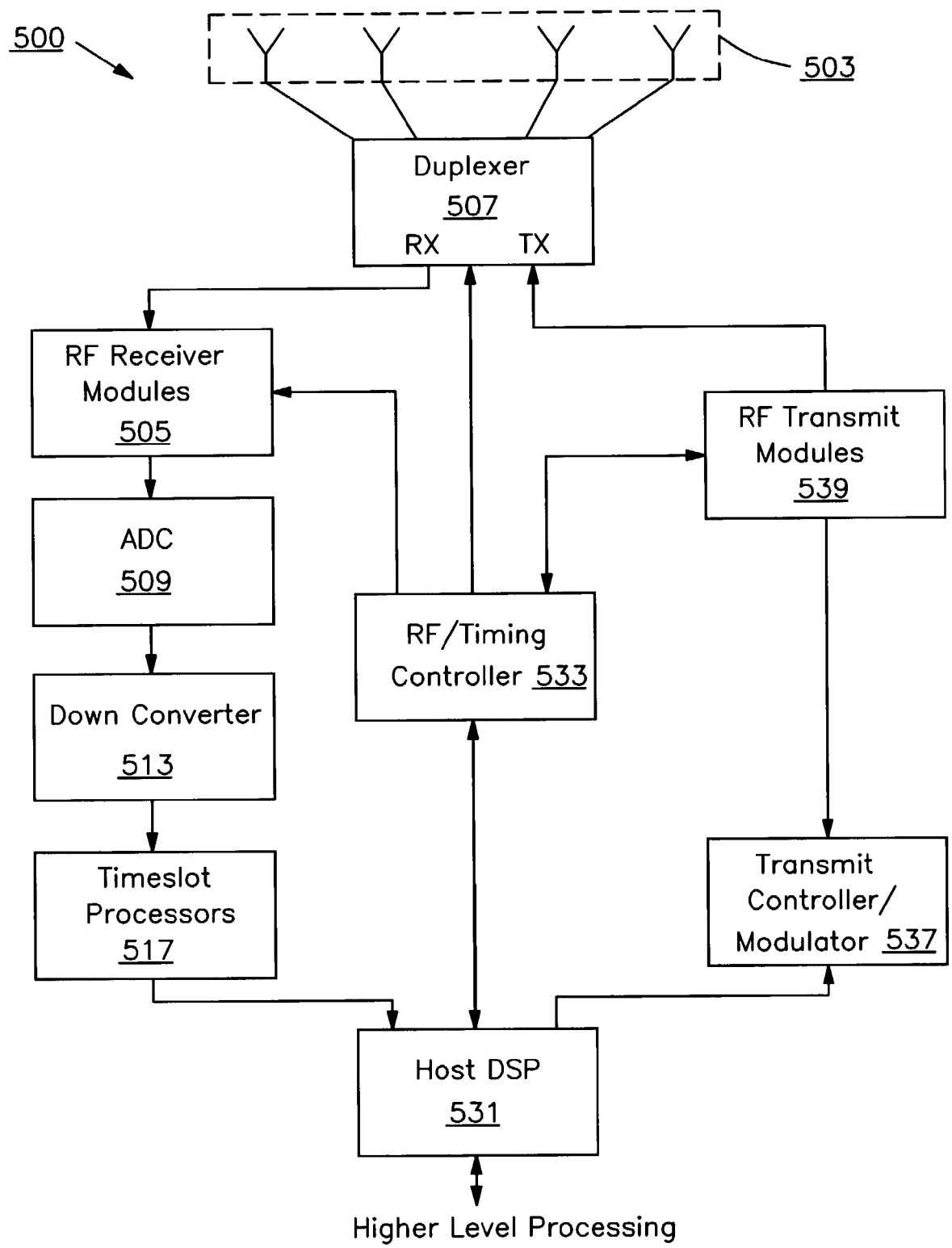
FIG. 5 is a simplified block diagram illustrating a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 5 shows an example of a base station 500 of a wireless communications system or network suitable for implementing the present invention. The system or network includes a number of subscriber stations, also referred to as remote terminals or user terminals, such as that shown in FIG. 6. The base station 500 may be connected to a wide area network (WAN) through its host DSP 531 for providing any required data services and connections external to the immediate wireless system. To support spatial diversity, a plurality of antennas 503 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 531 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station 500 to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 507, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 505, and are converted down in analog by RF receiver ("RX") modules 505 from the carrier frequency to an FM intermediate frequency ("IF"). This signal then is digitized (sampled) by analog to digital converters ("ADCs") 509. Final down-converting to baseband is carried out digitally. Digital filters can be used to implement the down-converting and the digital filtering, the latter using finite impulse response (FIR) filtering techniques. This is shown as block 513. The invention can be adapted to suit a wide variety of RF and IF carrier frequencies and bands.

There are, in the present example, eight down-converted outputs from each antenna's digital filter 513, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 517 (hereinafter "timeslot processor") for further processing, including calibration, according to one aspect of this invention. Eight Motorola DSP56300 Family DSPs can be used as timeslot processors, one per receive timeslot. The timeslot processors 517 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 517 is demodulated burst data for each of the eight receive timeslots. This data is sent to the host DSP processor 531 whose main function is to control all elements of the system and interface with the higher level processing, which is the processing which deals with what signals are required for communications in all the different control and service communication channels defined in the system's communication protocol. The host DSP 531 can be a Motorola DSP56300 Family DSP. In addition, timeslot processors send the determined receive weights for each user terminal to the host DSP 531. The host DSP 531 maintains state and timing information, receives uplink burst data from the timeslot processors 517, and programs the timeslot processors 517. In addition it decrypts, descrambles, checks error correcting code, and deconstructs bursts of the uplink signals, then formats the uplink signals to be sent for higher level processing in other parts of the base station 500. Furthermore DSP 531 may include a memory element to store data, instructions, or hopping functions or sequences. Alternatively, the base station 500 may have a separate memory element or have access to an auxiliary memory element. With respect to the other parts of the base station 500 it formats service data and traffic data for further higher processing in the base station 500, receives downlink messages and traffic data from the other parts of the base station 500, processes the downlink bursts and formats and sends the downlink bursts to a transmit controller/modulator, shown as 537. The host DSP also manages programming of other components of the base station 500 including the transmit controller/modulator 537 and the RF timing controller shown as 533.

The RF controller 533 reads and transmits power monitoring and control values, controls the duplexer 507 and receives timing parameters and other settings for each burst from the host DSP 531.

The transmit controller/modulator 537, receives transmit data from the host DSP 531. The transmit controller uses this data to produce analog IF outputs which are sent to the RF transmitter (TX) modules 539. Specifically, the received data bits are converted into a complex modulated signal, up-converted to an IF frequency, sampled, multiplied by transmit weights obtained from host DSP 531, and converted via digital to analog converters ("DACs") which are part of transmit controller/modulator 537 to analog transmit waveforms. The analog waveforms are sent to the transmit modules 539. The transmit modules 539 up-convert the signals to the transmission frequency and amplify the signals. The amplified transmission signal outputs are sent to antennas 503 via the duplexer/time switch 507.

Remote Terminal Structure

Figure 6:
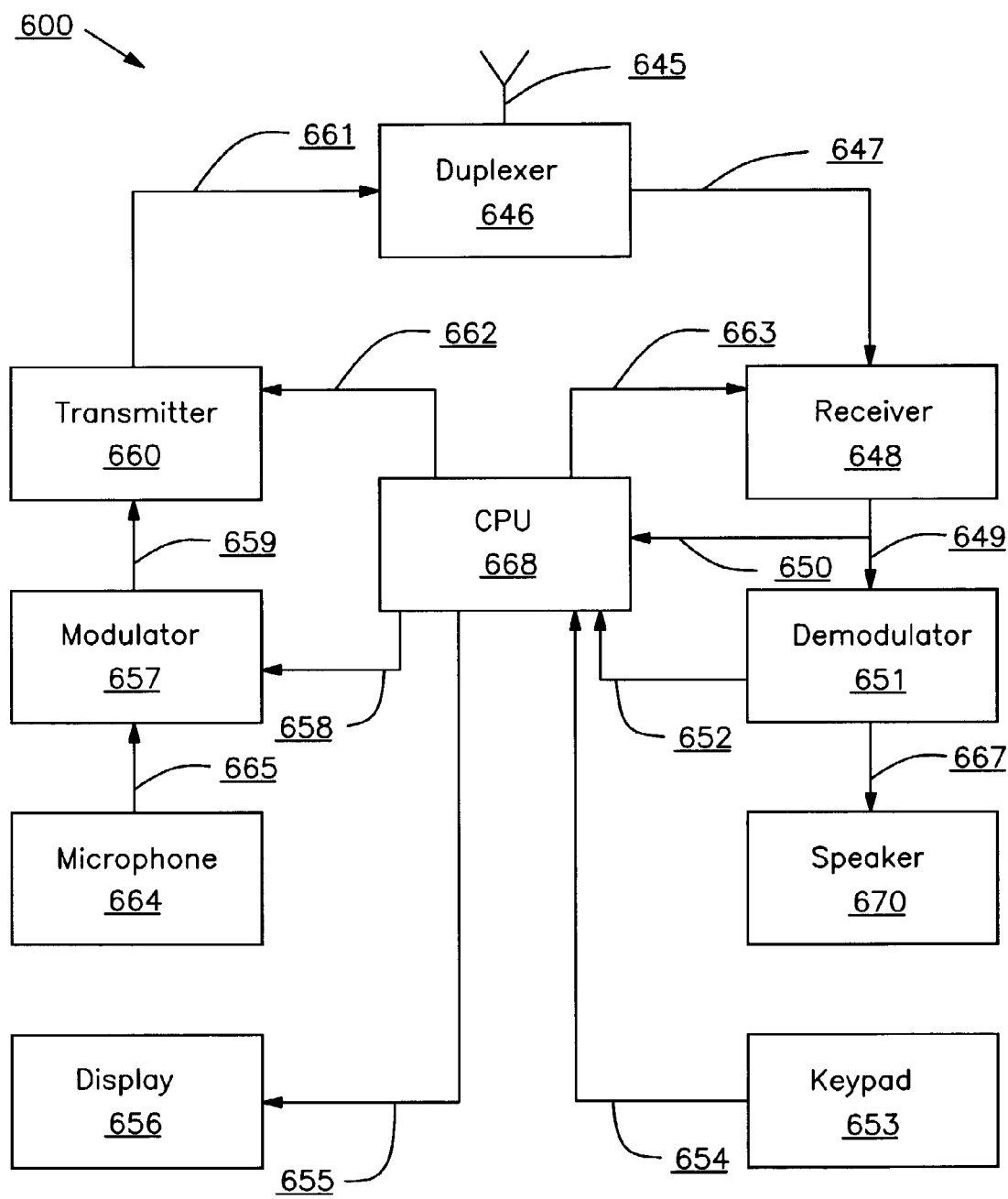
FIG. 6 is a simplified block diagram illustrating a remote terminal on which an embodiment of the invention can be implemented.

FIG. 6 depicts an example component arrangement in a remote terminal 600 that provides data or voice communication. The remote terminal's 600 antenna 645 is connected to a duplexer 646 to permit the antenna 645 to be used for both transmission and reception. The antenna can be omni-directional or directional. For optimal performance, the antenna can be made up of multiple elements and employ spatial processing as discussed above for the base station 500. In an alternate embodiment, separate receive and transmit antennas are used eliminating the need for the duplexer 646. In another alternate embodiment, where time division duplexing is used, a transmit/receive (TR) switch can be used instead of a duplexer as is well known in the art. The duplexer output 647 serves as input to a receiver 648. The receiver 648 produces a down-converted signal 649, which is the input to a demodulator 651. A demodulated received sound or voice signal 667 is input to a speaker 670.

The remote terminal 600 has a corresponding transmit chain in which data or voice to be transmitted is modulated in a modulator 657. The modulated signal to be transmitted 659, output by the modulator 657, is up-converted and amplified by a transmitter 660, producing a transmitter output signal 661. The transmitter output 661 is then input to the duplexer 646 for transmission by the antenna 645.

The demodulated received data 652 is supplied to a remote terminal central processing unit 668 (CPU) as is received data before demodulation 650. The remote terminal CPU 668 can be implemented with a standard DSP (digital signal processor) device such as a Motorola series 56300 Family DSP. This DSP can also perform the functions of the demodulator 651 and the modulator 657. The remote terminal CPU 668 controls the receiver through line 663, the transmitter through line 662, the demodulator through line 652 and the modulator through line 658. It also communicates with a keyboard 653 through line 654 and a display 656 through line 655. A microphone 664 and speaker 670 are connected through the modulator 657 and the demodulator 651 through lines 665 and 667, respectively for a voice communications remote terminal. In another embodiment, the microphone and speaker are also in direct communication with the CPU to provide voice or data communications. Furthermore remote terminal CPU 668 may also include a memory element to store data, instructions, and hopping functions or sequences. Alternatively, the remote terminal 600 may have a separate memory element or have access to an auxiliary memory element.

In one embodiment, the speaker 670, and the microphone 664 are replaced or augmented by digital interfaces well-known in the art that allow data to be transmitted to and from an external data processing device (for example, a computer). In one embodiment, the remote terminal's CPU 668 is coupled to a standard digital interface such as a PCMCIA interface to an external computer and the display, keyboard, microphone and speaker are a part of the external computer. The remote terminal's CPU 668 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention is described in the context of TDD (time division duplexing), but the invention is not limited to this context. The invention is also application to wireless systems in which a pilot signal typically is shared among multiple users at the same time, as is commonly required in standards for CDMA (code division multiple access) systems. Current examples of such wireless systems include WCDMA (wideband CDMA), cdma2000, IS-95, and HDR (high data rate) communications. The present system may also be applied to TDMA (time division multiple access) systems such as GSM (global system for mobile communications).

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa.

Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an adaptive antenna array. However, the user terminals can also contain antenna arrays, and can also perform spatial processing both on receiving and transmitting (uplink and downlink) within the scope of the present invention. Any step or process attributed to the uplink can be instead performed on the downlink and vice versa. Furthermore, in portions of the description above, certain functions performed by a base station could be coordinated across the network, or assigned to other components of the system. The invention does not require the use of adaptive antennas, and may be implemented in any system in which two radios are in communication with each other.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   receiving a signal;
   determining a quality of the received signal; and transmitting a power control message, with a selected size, to request a modification in transmission power, the power control message being based at least in part on the quality of the received signal;

wherein the power control message comprises a basic power control message and an optional extended power control message.

2. The method of claim 1, wherein the quality of the received signal is compared to a reference signal quality.

3. The method of claim 2, wherein determining the quality of the received signal includes determining the signal to interference plus noise ratio of the received signal.

4. The method of claim 1, wherein the basic power control message comprises one of a request to increase transmission power by a predetermined amount or a request to decrease transmission power by a predetermined amount.

5. The method of claim 1, wherein the extended power control message comprises a request to increase or decrease transmission power by an amount specified by the extended power control message.

6. The method of claim 1, wherein the extended power control message is included if the basic power control message is not sufficient.

7. The method of claim 6, wherein the extended power control message is included if the quality of the received signal is above a certain upper quality threshold or below a certain lower quality threshold.

8. The method of claim 6, wherein the extended power control message is sent if signal quality remains above a certain upper quality threshold or below a certain lower quality threshold for a certain number of consecutive bursts of data.

9. The method of claim 6, further comprising determining a time averaged signal quality for the received signal, wherein the extended power control message is included if the time averaged signal quality is above a certain upper quality threshold or below a certain lower quality threshold.

10. The method of claim 6, further comprising suppressing transmission of additional extended power control messages for a certain period after an extended power control message is transmitted.

11. The method of claim 10, wherein the period is a period that is sufficient to allow adjustment of the transmission power level in response to the transmitted extended power control message.

12. The method of claim 6, further comprising suppressing transmission of additional extended power control messages if the quality of the received signal remains outside a specified range after the transmission of a specified number of extended power control messages.

13. The method of claim 6, further comprising including the extended power control message in all power control requests for a data format comprising a large number of data bits.

14. The method of claim 6, further comprising suppressing transmission of extended power control messages for all power control requests if the received signal comprises a small number of data bits.

15. The method of claim 1, wherein the basic power control message comprises one bit of data.

16. The method of claim 1, wherein the extended power control message comprises a plurality of bits of data.

17. The method of claim 1, wherein the basic power control message is transmitted via a dedicated control channel.

18. The method of claim 17, wherein the dedicated control channel comprises a signal header.

19. The method of claim 1, wherein the extended power control message is transmitted via a shared control channel.

20. The method of claim 19, wherein the shared control channel comprises a data payload of a signal.

21. A method comprising:

transmitting a signal;

receiving a power control message, of a selected size, to request modification of -transmission power level, the power control message being based at least in part on the quality of the signal, the received power control message comprising a basic power control message and an optional extended power control message; and adjusting transmission power based at least in part on the received power control message.

22. The method of claim 21, further comprising ignoring the basic power control message if the extended power control message is received.

23. The method of claim 21, wherein the basic power control message comprises one of a request to increase the transmission power level by a predetermined amount or a request to decrease the transmission power level by a predetermined amount.

24. The method of claim 21, wherein the extended power control message comprises a request to increase or decrease the transmission power level by an amount specified by the extended power control message.

25. The method of claim 21, wherein the basic power control message comprises one bit of data.

26. The method of claim 21, wherein the extended power control message comprises a plurality of bits of data.

27. The method of claim 21, wherein the basic power control message is received via a dedicated control channel.

28. The method of claim 27, wherein the dedicated control channel comprises a signal header.

29. The method of claim 21, wherein the extended power control message is received via a shared control channel.

30. The method of claim 29, wherein the shared control channel is a data payload of a signal.

31. A radio unit comprising:

a receiver to receive a first signal, the radio signal determining a quality of the first signal; and a transmitter to transmit a second signal, the second signal including a power control message of selectable size to request a modification in transmission power, the power control message being based at least in part on the quality of the first signal, the power control message comprising a basic power control message and an optional extended power control message.

32. The radio unit of claim 31, wherein determining a quality of the first set of signals includes comparing the quality of the first signal to a reference signal quality.

33. The radio unit of claim 32, wherein determining a quality of the first signal includes determining the signal to interference plus noise ratio of the first signal.

34. The radio unit of claim 31, wherein the basic power control message comprises one of a request to increase transmission power by a predetermined amount or a request to decrease transmission power by a predetermined amount.

35. The radio unit of claim 31, wherein the extended power control message comprises a request to increase or decrease transmission power by an amount specified by the extended power control message.

36. The radio unit of claim 31, wherein the radio unit includes the extended power control message in the power control message if the basic power control message is not sufficient.

37. The radio unit of claim 36, wherein the radio unit includes the extended power control message in the power control message if the quality of the received signal is above a certain upper quality threshold or below a certain lower quality threshold.

38. The radio unit of claim 31, wherein the basic power control message comprises one bit of data.

39. The radio unit of claim 31, wherein the extended power control message comprises a plurality of bits of data.

40. The radio unit of claim 31, wherein the radio unit transmits the basic power control message via a dedicated control channel.

41. The radio unit of claim 40, wherein the dedicated control channel comprises a signal header of the second signal.

42. The radio unit of claim 31, wherein the radio unit transmits the extended power control message via a shared control channel.

43. The radio unit of claim 42, wherein the shared control channel comprises a data payload of the second signal.

44. A radio unit comprising:
a transmitter to transmit a first signal; and
a receiver to receive a second signal, the second signal including a power control message of selectable size, the power control message being based at least in part on a quality of the first signal, the radio unit adjusting transmission power of the transmitter in response to the power control message;
wherein the received power control message comprises a basic power control message and an optional extended power control message.

45. The radio unit of claim 44, wherein the radio unit ignores the basic power control message if the extended power control message is received.

46. The radio unit of claim 44, wherein the basic power control message comprises one of a request to increase the transmission power level by a predetermined amount or a request to decrease the transmission power level by a predetermined amount.

47. The radio unit of claim 44, wherein the extended power control message comprises a request to increase or decrease the transmission power level by an amount specified by the extended power control message.

48. The radio unit of claim 44, wherein the basic power control message comprises one bit of data.

49. The radio unit of claim 44, wherein the extended power control message comprises a plurality of bits of data.

50. The radio unit of claim 44, wherein the radio unit receives the basic power control message via a dedicated control channel.

51. The radio unit of claim 50, wherein the dedicated control channel comprises a signal header of the second signal.

52. The radio unit of claim 44, wherein the radio unit receives the extended power control message via a shared control channel.

53. The radio unit of claim 52, wherein the shared control channel is a data payload of the second signal.

* * * * *